US008682390B2

(12) United States Patent
Gonzalez et al.

(10) Patent No.: US 8,682,390 B2
(45) Date of Patent: Mar. 25, 2014

(54) MATCHING THEMES BETWEEN ACCESSORIES AND ASSOCIATED ELECTRONIC DEVICES

(75) Inventors: Evaristo Gonzalez, Jersey City, NJ (US); Ioannis Tsampalis, New Brunswick, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 787 days.

(21) Appl. No.: 12/650,677

(22) Filed: Dec. 31, 2009

(65) Prior Publication Data

US 2011/0159924 A1 Jun. 30, 2011

(51) Int. Cl.
*H04B 1/38* (2006.01)
(52) U.S. Cl.
USPC ..... 455/557; 455/550.1; 455/558; 455/556.1; 455/575.1; 455/575.8; 455/556.2
(58) Field of Classification Search
USPC ............. 455/575.8, 575.1, 575.6, 550.1, 557, 455/558, 425, 418, 419, 556.1, 556.2
See application file for complete search history.

(56) References Cited

U.S. PATENT DOCUMENTS

| 6,954,658 | B2 * | 10/2005 | Engstrom et al. ............. 455/567 |
| 7,496,355 | B2 * | 2/2009 | Nielsen et al. ............. 455/414.2 |
| 2003/0017848 | A1 * | 1/2003 | Engstrom et al. ............. 455/558 |
| 2003/0100346 | A1 * | 5/2003 | Kostiainen ..................... 455/567 |
| 2004/0091232 | A1 * | 5/2004 | Appling, III ..................... 386/46 |
| 2005/0009579 | A1 * | 1/2005 | Chen et al. ................. 455/575.1 |
| 2005/0014526 | A1 * | 1/2005 | Pan ............................ 455/550.1 |
| 2005/0026661 | A1 * | 2/2005 | Rheenen et al. ........... 455/575.8 |
| 2005/0139683 | A1 * | 6/2005 | Yi ................................. 235/486 |
| 2005/0197895 | A1 * | 9/2005 | Faulk .............................. 705/14 |
| 2006/0148522 | A1 * | 7/2006 | Chipchase et al. ............. 455/557 |
| 2010/0065630 | A1 * | 3/2010 | Spencer, II ..................... 235/382 |
| 2010/0144392 | A1 * | 6/2010 | Felt et al. ....................... 455/566 |
| 2011/0140841 | A1 * | 6/2011 | Bona et al. ................... 340/5.83 |
| 2011/0270523 | A1 * | 11/2011 | Cutitta, II ...................... 701/211 |
| 2012/0035989 | A1 * | 2/2012 | Abel et al. ................... 705/14.1 |

FOREIGN PATENT DOCUMENTS

| EP | 1 916 589 A1 | 4/2008 |
| JP | 2008-48071 | 2/2008 |
| WO | WO 2005/027480 A1 | 3/2005 |

OTHER PUBLICATIONS

Extended European Search Report, dated Jul. 28, 2011, for European Patent Application No. 10016212.2, filed Dec. 20, 2010 (published Jul. 6, 2011 as EP 2,341,695 A2), entitled "Matching Themes Between Accessories and Associated Electronic Devices" (European counterpart to U.S. Appl. No. 12/650,677).
European Search Report issued in European Patent Application No. 10016212.2-2414, dated Apr. 5, 2011.

* cited by examiner

*Primary Examiner* — Khai M Nguyen

(57) ABSTRACT

An accessory which has a theme and which may be used with an electronic device may be configured to electronically communicate information about that theme to the electronic device. Correspondingly, the electronic device may be configured to receive the theme information from the accessory and to reflect that theme based on the theme information. The reverse may also take place. The electronic device may be configured to electronically communicate theme information to the accessory, and the accessory may be configured to receive the theme information from the electronic device and to reflect that theme based on the theme information.

27 Claims, 3 Drawing Sheets

MATCHING THEMES BETWEEN ACCESSORIES AND ASSOCIATED ELECTRONIC DEVICES

BACKGROUND

1. Technical Field

This disclosure relates to themes used in electronic devices and in accessories for electronic devices, including themes used in covers for cell phones.

2. Description of Related Art

An accessory may extend the utility of an electronic device and may facilitate its customization. For example, a cell phone cover may be purchased imprinted with a colorful image. This may enhance the attractiveness of the cell phone and distinguish it from others. Audible as well as visual themes may be used. Themes may also be used in connection with other types of accessories and electronic devices.

However, the theme used for the accessory may be different from the theme used for the electronic device with which the accessory is used. This can diminish their effectiveness.

SUMMARY

An accessory for an electronic device may include a visual and/or auditory theme, an electronic memory configured to store theme information about the visual and/or auditory theme, an electronic communication system configured to electronically communicate the theme information from the electronic memory to an electronic communication system in the electronic device, and a configuration which permits the accessory to be used in conjunction with the electronic device.

The theme may include a type font and the theme information may include information about the type font.

The theme may include a wallpaper and the theme information may include information about the wallpaper.

The theme may include a color scheme and the theme information may include information about the color scheme.

The theme information may includes information about a location at which information about the theme may be obtained. The location may be an internet address.

The electronic device may be a cell phone.

The accessory may be cover for at least a portion of the cell phone.

The accessory may be configured to attach to the electronic device.

An electronic device for use in connection with an accessory which has a theme may include a programmable user interface configured to communicate with a user of the electronic device, an electronic communication system configured to electronically communicate with an electronic communication system in the accessory and to receive theme information about a visual and/or auditory theme from the accessory, an interface controller configured to cause the programmable user interface to visually and/or audibly reflect the theme based on the theme information, and a configuration which permits the electronic device to be used in conjunction with the accessory.

The programmable user interface may include a display and the theme information may include information about a type font.

The programmable user interface may include a display and the theme information may include information about a wallpaper.

The programmable user interface may include a display and the theme information may includes information about a color scheme.

The electronic device may be configured to attach to the accessory.

The interface controller may be configured to automatically cause the programmable user interface to visually and/or audibly reflect the theme without a user having to direct the interface controller to update the interface through operation of a user-operated update control.

An accessory for an electronic device may include a programmable user interface configured to communicate with a user of the electronic device, an electronic communication system configured to electronically communicate with an electronic communication system in the electronic device and to receive theme information about a visual and/or auditory theme from the electronic device, an interface controller configured to cause the programmable user interface to visually and/or audibly reflect the theme based on the theme information, and a configuration which permits the accessory to be used in conjunction with the electronic device.

An electronic device for use in connection with an accessory may include a visual and/or auditory theme, an electronic memory configured to store theme information about the visual and/or auditory theme, an electronic communication system configured to electronically communicate the theme information from the electronic memory to an electronic communication system in the accessory, and a configuration which permits the electronic device to be used in conjunction with the accessory.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
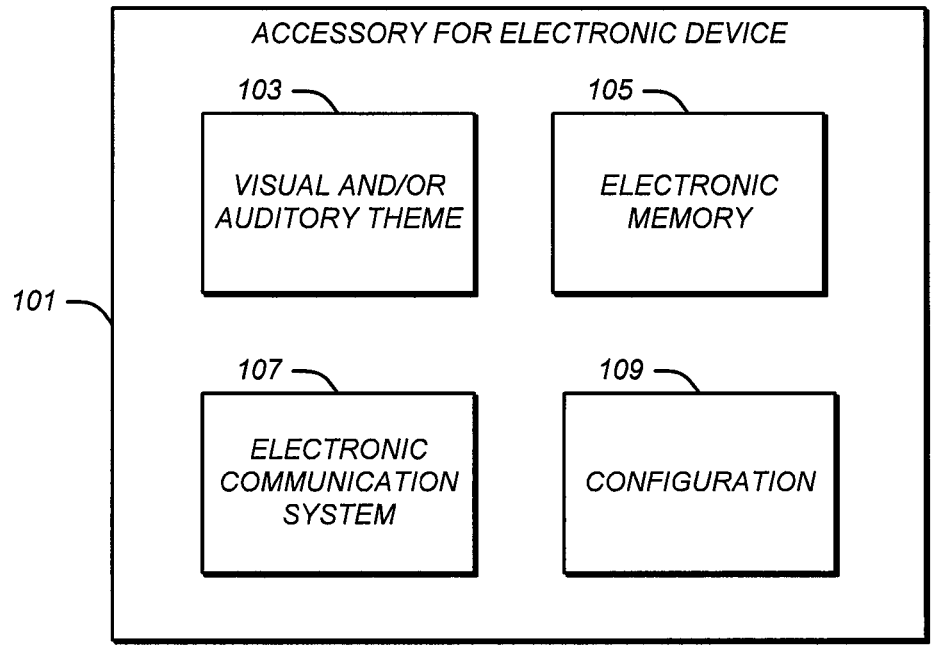
FIG. 1 illustrates an accessory which has a theme and which may be used with an electronic device.

FIG. 1 illustrates an accessory 101 which has a theme and which may be used with an electronic device.

The accessory 101 may be of any type. For example, the accessory may be a cover for a cell phone, PDA, laptop computer, electronic game, a radio, a CD player, and/or another type of electronic device. The accessory may itself be an electronic device, such as a wireless headset, an auxiliary display, or any third party consumer electronics, such as a camera, MP3 player, digital set top box, PC, television, or digital media gateway.

The accessory 101 may include a visual and/or auditory theme 103. The visual and/or auditory theme 103 may be of any type and may be communicated in any way. For example, a visual theme may include a type font, a wallpaper, or a color scheme. The visual theme may in addition or instead be based on a person, organization, place, activity, and/or a thing. The visual theme may consist of or include a pattern and/or an image.

An auditory theme may include background music, sets of sounds which are to be delivered at different times, ring tones, alerts, and/or text-to-speech read out voices.

A theme may include a combination of visual and/or auditory themes.

On the other hand, a theme as used herein does not include merely the display of an icon which signals the presence, absence, or status of an accessory, such as an icon which indicates the presence, absence, or status of a wireless network connection to the internet and/or a Bluetooth device. Still, a particular style for such an icon may be part of a theme.

The accessory 101 may be configured to deliver the visual and/or auditory theme 103 by any means. For example, a visual theme may be delivered by a decal affixed to the accessory or by an image painted on the accessory 101. A visual image may in addition or instead be communicated with a display, through a "video out" connection, and/or through a wireless connection. An auditory theme may be communicated using a loud speaker, headset, "audio out" connection, wireless connection, and/or through any other means.

The accessory 101 may include an electronic memory 105. The electronic memory 105 may be configured to store theme information about the visual and/or auditory theme 103.

The electronic memory 105 may be of any type. For example, the electronic memory 105 may consist of or include one or more RAMS, ROMS, PROMS, ePROMS, and/or flash memories.

The theme information that is stored within the electronic memory 105 may be of any type. For example, the theme information may include or consist of information which merely identifies the particular theme. It might in addition or instead include data which delineates some or all of the details of the theme, thus enabling the theme to be reproduced elsewhere.

For example, the accessory may be a cell phone cover and the theme may be an image of a dog on the cover. The image information in the electronic memory 105 may merely indicate that a "dog" theme is present. It may in addition or instead contain all of the data necessary for recreating a replicate of the image of the particular dog which constitutes the visual theme, as well as any other images or sounds which are part of theme.

The image information may in addition or instead include information identifying a location at which information about the theme may be found. For example, the theme information may include or consist of a link to a network address at which more information about the theme may be found, such as the URL address of an internet server. When a URL to an internet server is used, this may enable the content of the theme to be updated, without requiring any change in the accessory 101.

The accessory 101 may include an electronic communication system 107. The electronic communication system 107 may be configured to electronically communicate the theme information from the electronic memory 105 to an electronic communication system in the electronic device.

The electronic communication system 107 may be configured to communicate the theme information over a wired connection to the electronic device. For example, the electronic communication system 107 may include or consist of a communication system which is configured to communicate the theme information through a serial and/or a USB connection to the electronic device.

The electronic communication system 107 may in addition or instead be configured to communicate the theme information over a wireless connection to the electronic device. For example, the electronic communication system 107 may include or consist of a Bluetooth transmitter and/or an embedded RFID.

The accessory 101 may have a configuration 109 which permits the accessory 101 to be used in conjunction with the electronic device. For example, the accessory 101 may have a configuration 109 which enables the accessory 101 to be attached to the electronic device. For example, the accessory 101 may include a snap mechanism configured to enable the accessory 101 to be snapped onto the electronic device. The accessory 101 may in addition or instead be configured to be used in association with the electronic device without being attached to it.

Figure 2:
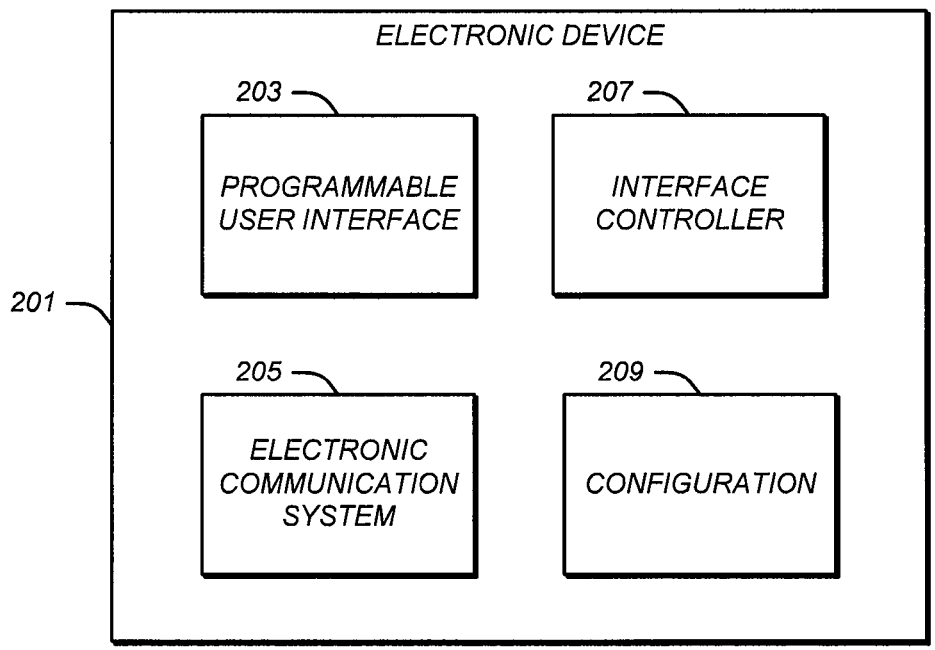
FIG. 2 illustrates an electronic device which may be used with an accessory which has a theme.

FIG. 2 illustrates an electronic device 201 which may be used with an accessory which has a theme.

The electronic device 201 may be of any type. For example, the electronic device 201 may include or consist of a cell phone, PDA, laptop computer, electronic game, radio, and/or CD player. The electronic device may in addition or instead include an appliance, such as a stove, refrigerator, dishwasher, and/or washing machine.

The electronic device 201 may include a programmable user interface 203. The programmable user interface 203 may be configured to communicate with the user of the electronic device 201. The programmable user interface 203 may include any type of user interface device or combination of devices, such as a display, touch screen, "video out" connection, loudspeaker, headphone, "audio out" connection, and/or a wireless video and/or audio output.

The programmable user interface 203 may be configured to communicate different themes to the user. The themes may be of any type, such as any of the types of themes discussed above in connection with the visual and/or auditory theme 103 and the accessory 101.

The electronic device 201 may include an electronic communication system 205. The electronic communication system 205 may be configured to electronically communicate with an electronic communication system within an accessory and to receive theme information about a visual and/or auditory theme from the accessory.

The electronic communication system 205 may be of any type. For example, the electronic communication system 205 may be configured to communicate wirelessly or through wires with the accessory, such as the accessory 101. Devices which correspond to the types of devices which were discussed above in connection with the electronic communication system 107 may be used, such as devices which implement wired communications using serial and/or USB protocol, and/or devices which implement a wireless communication, such as a Bluetooth device and/or a transceiver which may be used in conjunction with RFID's in the accessory.

The electronic communication system 205 may be configured to receive theme information of any type. For example, the theme information may be any of the types of theme information which are discussed above in connection with the electronic memory 105.

The electronic device 201 may include an interface controller 207. The interface controller 207 may be configured to cause the programmable user interface 203 to visually and/or audibly reflect the theme in the accessory based on the theme information.

To facilitate this function, the interface controller 207 may include a memory in which data containing the theme is stored. For example, the data may consist of or include one or more images which reflect the theme, such as data which may be used in connection with wallpaper, icons, windows, fonts, color schemes, and/or any other visual object. The data may in addition or instead include background music and/or sounds which are communicated during different phases of the operation of the electronic device 201.

The interface controller 207 may be configured to automatically cause the programmable user interface 203 to visually and/or audibly reflect the theme in the accessory without a user having to direct the interface controller 207 to update the interface through operation of a user-operated update control. The interface controller 207 may be configured to cause the theme to be reflected as soon as an accessory with a theme is detected by the electronic communication system 205 and the theme information is obtained from it.

The interface controller 207 may be configured to store data which embodies a multitude of themes. The theme information which is received by the electronic communication system 205 may merely identify one of these particular themes. In this case, the interface controller 207 may be configured to select this particular theme and to deliver it through the programmable user interface 203.

The interface controller 207 may instead be configured to obtain the data containing the details of the theme from another source. This other source, for example, may be the accessory. This other source may in addition or instead be a different device, such as a server on the internet. In this case, the theme information which is provided by the accessory may merely consist of an address for the server on the internet. In this case, the interface controller 207 may be configured to send a request to the server for the theme data and to receive that data and deliver it to the programmable user interface 203. The server may be configured to house data for multiple themes, in which case the theme information from the accessory may indicate which theme is desired, in addition to the address of the server.

The electronic device 201 may include a configuration 209 which permits the electronic device 201 to be used in conjunction with an accessory. For example, the electronic device 201 may be a cell phone which is configured to allow an accessory cover to be snapped on the back and/or front of the cell phone. Although not illustrated in FIG. 3A, the cover 301 may be configured to snap on the cell phone 305. The cover 301 may include an electronic memory and an electronic communication system of one of the types discussed above in connection with the electronic memory 105 and the electronic communication system 107, respectively.

Figures 3A, 3B:
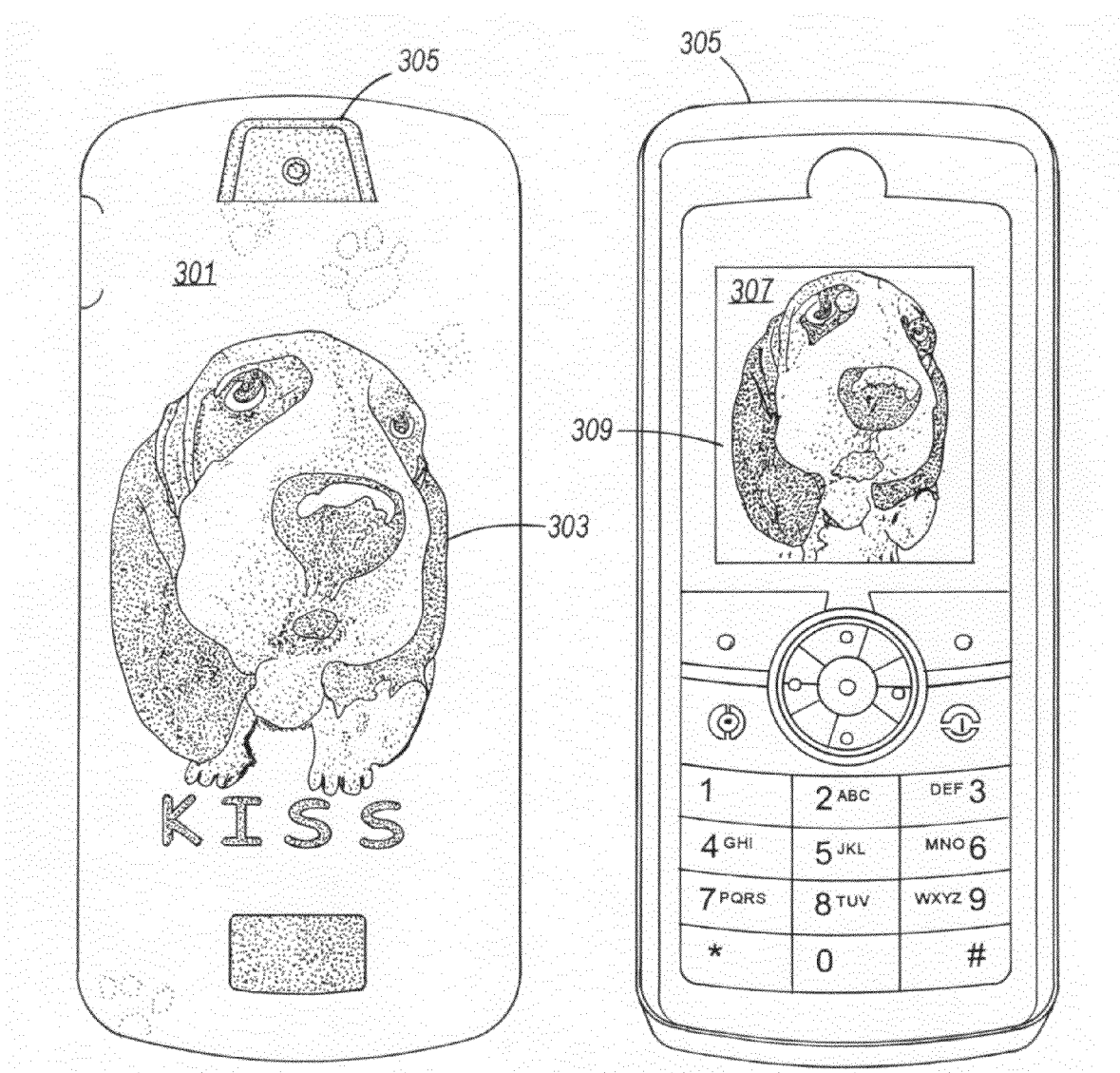
FIG. 3A illustrates a cover which has an animal theme and which is used as an accessory for the back of a cell phone.
FIG. 3B illustrates the front of the cell phone which is illustrated in FIG. 3A and which reflects the animal theme in the form of wallpaper on a display.

FIG. 3A illustrates a cover 301 which has an animal theme 303 and which is used as an accessory for the back of a cell phone 305. The cover 301 may be configured to snap onto the back of the cell phone 305.

FIG. 3B illustrates the front of the cell phone 305 which is illustrated in FIG. 3A and which reflects the animal theme in the form of a wallpaper 307 on a display 309. The cell phone 305 may include one of the types of interface controllers and electronic communication systems that are discussed above in connection with the interface controller 207 and the electronic communication system 205, respectively.

The data which contains the animal theme in the form of the wallpaper 307 may have been stored in the interface controller within the cell phone 305, within the electronic memory 105 within the cover 301, and/or at a different location, such as at an internet server.

The theme which is reflected may be expressed in any form. In addition or instead of the wallpaper 307, the theme may be express in the color or style of icons which are displayed, in the color or style of windows which are displayed, in the color or style of a font, through background or operational sounds, and/or in any other means.

Figure 4:
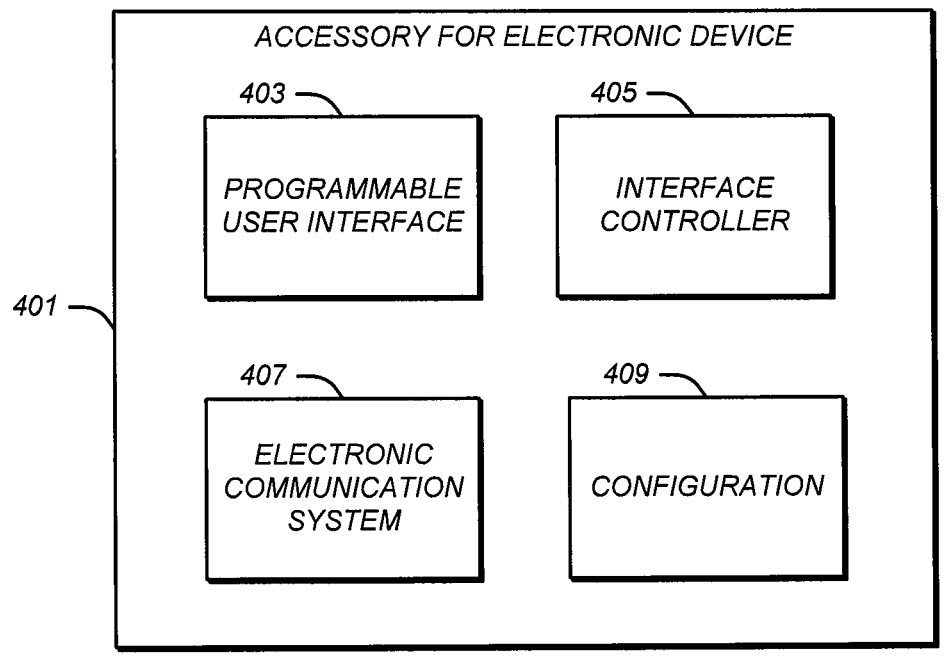
FIG. 4 illustrates an alternate configuration of an accessory which may be used with an electronic device which has a theme.

FIG. 4 illustrates an alternate configuration of an accessory 401 which may be used with an electronic device which has a theme. As illustrated in FIG. 4, the accessory 401 may include a programmable user interface 403, an interface controller 405, an electronic communication system 407, and a configuration 409. Each of these may be the same, respectively, as the programmable user interface 203, the interface controller 207, the electronic communication system 205, and the configuration 209 which are illustrated in FIG. 2 and discussed above. One difference may be that the accessory 401 may be configured to interface with an electronic device which provides theme information, not vice versa. In other words, the accessory 401 illustrated in FIG. 4 may have its own user interface and may be configured to cause that user interface to reflect a theme that is communicated by theme information from the electronic device with which the accessory is used.

Figure 5:
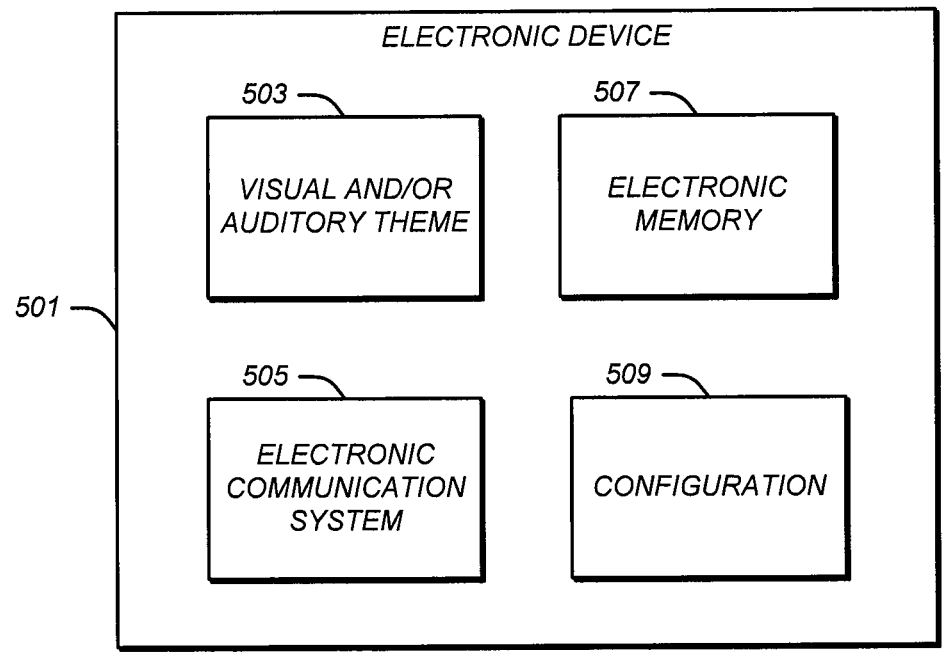
FIG. 5 illustrates an alternate configuration of an electronic device which has a theme and which may be used with an accessory.

FIG. 5 illustrates an alternate configuration of an electronic device 501 which has a theme and which may be used with an accessory. The electronic device may include a visual and/or auditory theme 503, an electronic communication system 505, an electronic memory 507, and a configuration 509. Each of these may be the same, respectively, as the visual and/or auditory theme 103, the electronic memory 105, the electronic communication system 107, and the configuration 109 that are illustrated in FIG. 1 and discussed above. One difference may be that the electronic device 501 may be configured to provide theme information to the accessory, not vice versa.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, a wireless handset may enter a car environment and recognize a wireless-enabled display. The handset may change both its visual and audio theme, along with top level user interface, as it communicates and shares data with the display. Similarly, an electronic media device may enter the home and recognize a home entertainment system. The media device may then change its visual and audio theme, along with its high level user interface.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. An electronic device for use in connection with an accessory which has a user-interface theme, the electronic device comprising:
   a programmable user interface configured to communicate with a user of the electronic device;
   an electronic communication system configured to electronically communicate with an electronic communication system in the accessory and to receive user-interface theme information about a visual and/or auditory user-interface theme from the accessory, the user-interface theme information including a location at which information about the user-interface theme may be obtained;
   an interface controller configured to cause the programmable user interface to visually and/or audibly reflect the user-interface theme based on the received theme information, including updating the user-interface theme based on the information about the user-interface theme from the location; and
   a configuration which permits the electronic device to be used in conjunction with the accessory.

2. The electronic device of claim 1 wherein the programmable user interface includes a display and the user-interface theme information includes information about a type font.

3. The electronic device of claim 1 wherein the programmable user interface includes a display and the user-interface theme information includes information about a wallpaper.

4. The electronic device of claim 1 wherein the programmable user interface includes a display and the user-interface theme information includes information about a color scheme.

5. The electronic device of claim 1 wherein the location is an internet address.

6. The electronic device of claim 1 wherein the electronic device is a cell phone.

7. The electronic device of claim 1 wherein the electronic device is configured to attach to the accessory.

8. The electronic device of claim 7 wherein the electronic device is a cell phone and the accessory is a cover for at least a portion of the cell phone.

9. The electronic device of claim 1 wherein the interface controller is configured to automatically cause the programmable user interface to visually and/or audibly reflect the user-interface theme without a user having to direct the interface controller to update the interface through operation of a user-operated update control.

10. The electronic device of claim 1 wherein the user-interface theme information includes ring tones.

11. The electronic device of claim 1 wherein the user-interface theme information includes information about a text-to-speech read out voice.

12. The electronic device of claim 1 wherein the electronic communication system is configured to receive the user-interface theme information from the accessory over a wireless connection.

13. The electronic device of claim 12 wherein the electronic communication system is configured to receive the user-interface theme information from an RFID in the accessory.

14. An accessory for an electronic device comprising:
   a programmable user interface configured to communicate with a user of the electronic device;
   an electronic communication system configured to electronically communicate with an electronic communication system in the electronic device and to receive theme information about a visual and/or auditory theme from the electronic device;
   an interface controller configured to cause the programmable user interface to visually and/or audibly reflect the theme based on the received theme information; and
   a configuration which permits the accessory to be used in conjunction with the electronic device,
   the accessory being configured to attach to the electronic device, the electronic device being a cell phone, and the accessory being configured as a cover for at least a portion of the cell phone.

15. The accessory of claim 14 wherein the programmable user interface includes a display and the theme information includes information about a type font.

16. The accessory of claim 14 wherein the programmable user interface includes a display and the theme information includes information about a wallpaper.

17. The accessory of claim 14 wherein the programmable user interface includes a display and the theme information includes information about a color scheme.

18. The accessory of claim 14 wherein the theme information includes a location at which information about the theme may be obtained.

19. The accessory of claim 18 wherein the location is an internet address.

20. The accessory of claim 14 wherein the theme information includes ring tones.

21. The accessory of claim 14 wherein the theme information includes information about a text-to-speech read out voice.

22. The accessory of claim 14 wherein the electronic communication system is configured to receive the theme information from the electronic device over a wireless connection.

23. The accessory of claim 22 wherein the electronic communication system is configured to receive the theme information from an RFID in the electronic device.

24. An accessory for an electronic device comprising:
- a programmable user interface configured to communicate with a user of the electronic device;
- an electronic communication system configured to electronically communicate with an electronic communication system in the electronic device and to receive theme information about a visual and/or auditory theme from the electronic device;
- an interface controller configured to cause the programmable user interface to visually and/or audibly reflect the theme based on the received theme information,
- the interface controller being configured to automatically cause the programmable user interface to visually and/or audibly reflect the theme without a user having to direct the interface controller to update the interface through operation of a user-operated update control; and
- a configuration which permits the accessory to be used in conjunction with the electronic device.

25. The accessory of claim 24 wherein the electronic device is a cell phone.

26. The accessory of claim 24 wherein the accessory is configured to attach to the electronic device.

27. The accessory of claim 26 wherein the electronic device is a cell phone and the accessory is a cover for at least a portion of the cell phone.

* * * * *